(No Model.)

E. BERNINGHAUS.
SHAVING CUP.

No. 453,538. Patented June 2, 1891.

WITNESSES:
L. M. Adams
H. Longfellow

INVENTOR:
Eugene Berninghaus
By C. J. Bailey
Attorney.

UNITED STATES PATENT OFFICE.

EUGENE BERNINGHAUS, OF CINCINNATI, OHIO.

SHAVING-CUP.

SPECIFICATION forming part of Letters Patent No. 453,538, dated June 2, 1891.

Application filed August 6, 1890. Serial No. 361,156. (No model.)

*To all whom it may concern:*

Be it known that I, EUGENE BERNINGHAUS, of Cincinnati, in the county of Hamilton and State of Ohio, have invented a new and useful Improvement in Shaving-Cups, which improvement is fully set forth in the following specification and accompanying drawings, in which—

Figures 1, 2:
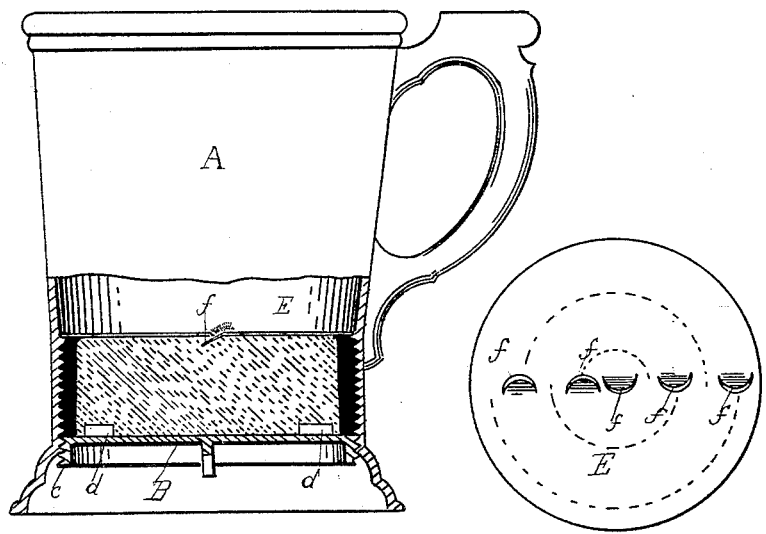
Figure 3:
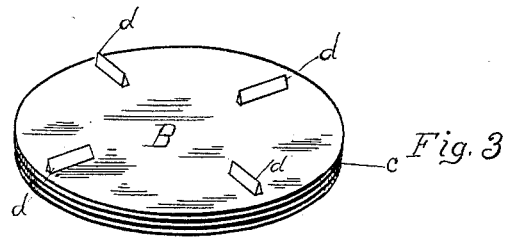
Figure 4:
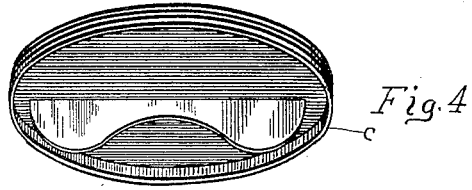

Figure 1 is a side view of my improved cup, the lower portion being in section to show the improvement; Fig. 2, a top view of cutting-diaphragm; Fig. 3, a view of the rotatable bottom disk on which the cake of soap is placed; Fig. 4, an under view of the same, showing a flange by which it is rotated.

The object of this invention is to provide a cup to be used in shaving, whereby the cake of soap can be rotated gradually upward against a diaphragm within the cup, said diaphragm being provided with downturned cutting-lips that slice thin strips of soap, which pass upward through the lip-openings, and can then be acted upon by the lathering-brush. The advantage of this arrangement is that the cake of soap is preserved from an excess of retained moisture, which softens and sours it. The soap being fed sparingly into the lather-compartment as needed, the cup can be easily cleared and rinsed out after use without danger of wetting or displacing the cake of soap.

The several features embodied in my improvement will now be more particularly explained, reference being had to the accompanying drawings.

The cup A is formed with open aperture, the lower interior portion of which is threaded.

The soap-disk B is provided with a rim-flange C, also threaded to screw into the threaded cup-aperture. This soap-disk is provided with a number of small vertical projections, spurs, or corrugations $d$ on its upper surface, which enter the cake when it is pressed down on the disk, and the cake is thereby caused to rotate with the disk.

The diaphragm E is formed of sheet metal, the cutting-lips $f$ being inclined downward. These lips are so arranged in their relative location that when the cake is rotated the uncut portion passing between two adjacent lips will encounter the lips diametrically opposite, so that the whole surface is reduced simultaneously. The diaphragm E is preferably soldered in position and forms the bottom of the lather-compartment, occupying a position just above the threaded portion of the cup-aperture.

The operation is as follows: The bottom disk is unscrewed and the cake placed on and pressed down on the points. Then the disk, with the cake, is inserted in the threaded aperture and screwed upward until the cake is in contact with the diaphragm. A little further rotation will cause the cutting-lips to cut soap strips, whose ends protrude upwardly through the openings, and these strips closely filling the openings will prevent any downward passage of water into the soap-chamber. The cake can be used down to the points of the disk, when a fresh cake can be readily and securely stuck to the remaining surface.

Having described my invention, what I claim as new, and desire to secure by Letters Patent, is—

A shaving-cup having the inner side of the lower portion threaded, a stationary bottom above said threaded portion and provided with downwardly-bent cutting-lips, and a threaded disk having spurs on its upper face to engage the cake of soap, said disk adapted to be moved up or down with respect to the stationary bottom by its threaded edge engaging the screw-threads on the lower portion of cup, substantially as set forth.

In testimony that I claim the foregoing I have hereunto set my hand this 2d day of August, 1890, in the presence of witnesses.

EUGENE BERNINGHAUS.

Witnesses:
SCOTT HOLMES,
HERMAN SCHRADER.